(12) United States Patent
Bhatnagar et al.

(10) Patent No.: US 10,829,596 B2
(45) Date of Patent: *Nov. 10, 2020

(54) MOBILE ELECTRONIC DEVICES MADE OF LOW-CHLORINE AROMATIC POLYSULFONES

(71) Applicant: SOLVAY SPECIALTY POLYMERS USA, LLC, Alpharetta, GA (US)

(72) Inventors: Atul Bhatnagar, Alpharetta, GA (US); Hong Chen, Alpharetta, GA (US); Theodore Moore, Floresville, TX (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/991,755

(22) Filed: May 29, 2018

(65) Prior Publication Data

US 2018/0298147 A1    Oct. 18, 2018

Related U.S. Application Data

(63) Continuation of application No. 14/653,500, filed as application No. PCT/EP2013/077052 on Dec. 18, 2013, now Pat. No. 10,005,887.

(60) Provisional application No. 61/738,683, filed on Dec. 18, 2012.

(30) Foreign Application Priority Data

Feb. 12, 2013   (EP) ..................................... 13154976

(51) Int. Cl.

| | |
|---|---|
| *C08G 75/23* | (2006.01) |
| *C08K 3/34* | (2006.01) |
| *C08K 7/14* | (2006.01) |
| *B29C 45/14* | (2006.01) |
| *H04M 1/02* | (2006.01) |
| *C08L 81/06* | (2006.01) |
| *B29K 81/00* | (2006.01) |
| *B29K 105/16* | (2006.01) |
| *B29K 509/08* | (2006.01) |
| *B29L 31/34* | (2006.01) |
| *C08K 3/013* | (2018.01) |
| *B29K 509/02* | (2006.01) |
| *B29L 9/00* | (2006.01) |

(52) U.S. Cl.
CPC .............. *C08G 75/23* (2013.01); *B29C 45/14* (2013.01); *C08K 3/34* (2013.01); *C08K 7/14* (2013.01); *C08L 81/06* (2013.01); *H04M 1/0202* (2013.01); *B29K 2081/06* (2013.01); *B29K 2105/16* (2013.01); *B29K 2509/02* (2013.01); *B29K 2509/08* (2013.01); *B29K 2995/0058* (2013.01); *B29K 2995/0069* (2013.01); *B29K 2995/0077* (2013.01); *B29K 2995/0089* (2013.01); *B29L 2009/00* (2013.01); *B29L 2031/3481* (2013.01); *C08K 3/013* (2018.01); *Y10T 428/1397* (2015.01)

(58) Field of Classification Search
None
See application file for complete search history.

(56) References Cited

U.S. PATENT DOCUMENTS

| | | | |
|---|---|---|---|
| 9,102,798 B2 * | 8/2015 | Weber ................... | C08G 75/23 |
| 10,005,887 B2 * | 6/2018 | Bhatnagar ............... | C08K 3/34 |
| 2009/0283476 A1 | 11/2009 | Schwab et al. | |
| 2012/0029106 A1 | 2/2012 | Weber et al. | |
| 2012/0149796 A1 | 6/2012 | Weber et al. | |
| 2014/0039102 A1 | 2/2014 | Gallucci et al. | |
| 2014/0357782 A1 * | 12/2014 | Gautam ................... | C08K 7/14 |
| | | | 524/540 |
| 2015/0129487 A1 * | 5/2015 | Bhatnagar ............. | C08G 75/23 |
| | | | 210/493.5 |

FOREIGN PATENT DOCUMENTS

| | | |
|---|---|---|
| EP | 106023 A2 | 4/1984 |
| EP | 937749 A2 | 8/1999 |
| WO | 2004055927 A2 | 7/2004 |
| WO | 2010112508 A1 | 10/2010 |
| WO | 2011020823 A1 | 2/2011 |

OTHER PUBLICATIONS

Murphy J., in "Additives for Plastics Handbook", 2nd Edition, 2001, Chapter 5.2.3., p. 43-48—Elsevier Advanced Technology.

* cited by examiner

*Primary Examiner* — Nicole M. Buie-Hatcher
(74) *Attorney, Agent, or Firm* — Beatrice C. Ortego

(57) ABSTRACT

The present invention relates a mobile electronic device comprising at least one part made of a polymer composition comprising for more than 80% by weight (% wt.) relative to the total weight of the composition (C) of an aromatic polysulfone polymer comprising a residual chlorine content in an amount of less than 25 µeq/g polymer.

17 Claims, No Drawings

MOBILE ELECTRONIC DEVICES MADE OF LOW-CHLORINE AROMATIC POLYSULFONES

This application claims priority to U.S. provisional application No. 61/738,683 filed on 18 Dec. 2012 and to European application No. 13154976.8 filed on 12 Feb. 2013, the whole content of each of these applications being incorporated herein by reference for all purposes.

FIELD OF INVENTION

The present invention relates to mobile electronic devices comprising at least one part made of an aromatic polysulfone polymer composition wherein said aromatic polysulfone polymer is characterized by having a low amount of residual chlorine content. The invention further relates to methods of manufacturing said mobile electronic devices and parts thereof.

BACKGROUND OF THE INVENTION

Electronic devices, and in particular mobile electronic devices, such as mobile telephones, personal digital assistants, laptop computers, tablet computers, global positioning system receivers, portable games, radios, cameras and camera accessories, and the like are becoming increasingly widely used in many different environments.

It is thus important that said electronic devices including their different parts such as notably the different electronic components and a plurality of cables for electrically connecting said electronic components are made from polymeric materials that are easy to process into the various parts and that said polymeric materials have good tensile strength, tensile elongation, chemical resistance, impact resistance, flame resistance, moisture resistance.

For example, poly(arylethersulfones) could be regarded as such polymeric materials as they possess a number of attractive features such as excellent high temperature resistance, good electrical properties, and toughness.

A commercially important group of poly(arylethersulfones) includes polysulfone polymers identified herein as PSU. PSU contains reacted units of diphenyl sulfone and bisphenol A (BPA). Such PSU is commercially available from Solvay Specialty Polymers USA, L.L.C. (i.e., under the trademark UDEL® polysulfone). The structure of the repeating units of a UDEL® polysulfone, made by condensing bisphenol A (BPA) and 4,4'-dichlorodiphenyl sulfone (DCDPS), is shown below:

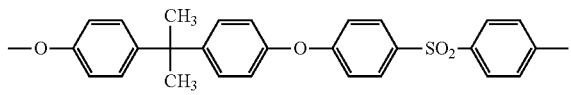

PSU has a high glass transition temperature (e.g., about 185° C.) and exhibits high strength (>70 MPa) and toughness (>65 J/m notched impact, 50-100% elongation at break).

It is further important that the parts of such devices be made from polymeric materials that, are able to withstand the rigors of frequent use of such articles, also comply with the severe fire-protection requirements, such as notably having very low residual chlorine content and can meet challenging aesthetic demands such as notably having very low discoloration effects as well showing very minor degradation while not interfering with their intended operability.

Thus, there is still a continuous high need for mobile electronic devices comprising at least one part made of a polymeric compositions wherein said polymeric compositions features excellent mechanical properties (and in particular good stiffness, tensile properties and impact resistance), good processability, good flow, good thermal stability, low moisture uptake and at the same time comply with the severe environmental requirements and causing no discoloration or other degradation phenomena.

SUMMARY OF INVENTION

The present invention addresses the above detailed needs and relates to a mobile electronic device comprising at least one part made of a polymer composition [composition (C), herein after] comprising for more than 80% by weight (% wt.) relative to the total weight of the composition (C) of an aromatic polysulfone polymer comprising a residual chlorine content in an amount of less than 25 μeq/g polymer [polymer (PSU$_{Cl}$), herein after], wherein more than 50% by moles of the recurring units of said polymer (PSU$_{Cl}$) are recurring units (R$_{PSU\_Cl}$) of formula (A), herein below:

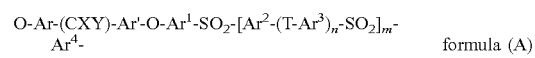

formula (A)

wherein
n and m, equal to or different from each other, are independently zero or an integer of 1 to 5;
each of Ar, Ar', Ar$^1$, Ar$^2$, Ar$^3$ and Ar$^4$ equal to or different from each other and at each occurrence, is an aromatic moiety,
X and Y, equal to or different from each other and at each occurrence, are independently selected from the group consisting of hydrogen, halogen, alkyl, arylalkyl, hydroxyalkyl, hydroxyarylalkyl, halogenated alkyl, halogenated arylalkyl, alkenyl, alkynyl, alkyloxy, arylalkyloxy, aminoalkyl, aminoarylalkyl, alkyl and arylalkyl substituted by carboxylic acid, ester, amide, aldehyde and ketone function, and
T is a bond or a divalent group optionally comprising one or more than one heteroatom; preferably T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

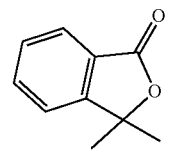

wherein said polymer (PSU$_{Cl}$) comprises at least two chain ends and wherein at least one chain end comprises a unit [(unit R$_{end}$), herein after] of formula (B), herein below:

formula (B)

wherein Ar, Ar', X and Y are as defined above and R$_1$ is a hydrocarbon, optionally halogenated, having 1-30 carbon atoms selected from the group consisting of saturated or unsaturated, branched or unbranched, aliphatic, aromatic, cyclic, or polycyclic hydrocarbons; a linear or branched alkoxy group having 1-30 carbon atoms, an aryloxy group or an arylalkoxy group. The invention also pertains to a method for the manufacture of the above part of said mobile electronic device.

DETAILED DESCRIPTION OF THE PRESENT INVENTION

The term "mobile electronic device" is intended to denote an electronic device that is designed to be conveniently transported and used in various locations. Representative examples of mobile electronic devices include mobile phones, personal digital assistants, laptop computers, tablet computers, radios, cameras and camera accessories, watches, calculators, music players, global positioning system receivers, portable games, hard drives and other electronic storage devices, and the like.

The at least one part of the mobile electronic device according to the present invention may be selected from a large list of articles such as fitting parts, snap fit parts, mutually moveable parts, functional elements, operating elements, tracking elements, adjustment elements, carrier elements, frame elements, switches, connectors, cables and housings, which can be notably produced by injection molding, extrusion or other shaping technologies.

In particular, the polymer composition (C) is very well suited for the production of cables and housing parts of mobile electronic device.

Therefore, the at least one part of the mobile electronic device according to the present invention is advantageously a mobile electronic device housing or a cable.

A cable can be notably wires electrically connecting the different parts of the mobile electronic phone, as listed above By "mobile electronic device housing" is meant one or more of the back cover, front cover, antenna housing, frame and/or backbone of a mobile electronic device. The housing may be a single article or comprise two or more components. By "backbone" is meant a structural component onto which other components of the device, such as electronics, microprocessors, screens, keyboards and keypads, antennas, battery sockets, and the like are mounted. The backbone may be an interior component that is not visible or only partially visible from the exterior of the mobile electronic device. The housing may provide protection for internal components of the device from impact and contamination and/or damage from environmental agents (such as liquids, dust, and the like). Housing components such as covers may also provide substantial or primary structural support for and protection against impact of certain components having exposure to the exterior of the device such as screens and/or antennas.

In a preferred embodiment, the mobile electronic device housing is selected from the group consisting of a mobile phone housing, a tablet housing, a laptop computer housing and a tablet computer housing. Excellent results were obtained when the part of the mobile electronic device according to the present invention was a mobile phone housing.

The at least one part of the mobile electronic device according to the present invention is advantageously characterized by a thickness of a flat portion of said part being 0.9 mm or less, preferably 0.8 mm or less, more preferably 0.7 mm or less, still more preferably 0.6 mm or less and most preferably 0.5 mm or less on average. The term "on average" is herein intended to denote the average thickness of the part based on the measurement of its thickness on at least 3 points of at least one of its flat portions.

The Polymer ($PSU_{Cl}$)

As said, the recurring units of the polymer ($PSU_{Cl}$) comprises more than 50% by moles of recurring units ($R_{PSU\_Cl}$) of formula (A), as detailed above.

The aromatic moiety in each of Ar, Ar', $Ar^1$, $Ar^2$, $Ar^3$ and $Ar^4$ equal to or different from each other and at each occurrence is preferably complying with following formulae:

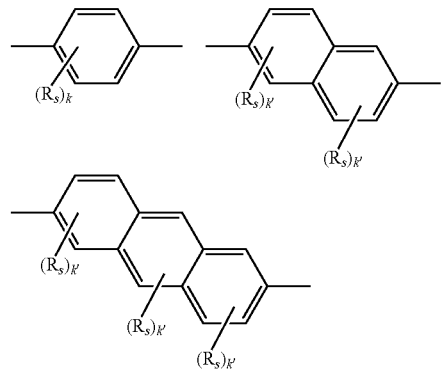

wherein:
  each $R_s$ is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
  k is zero or an integer of 1 to 4; k' is zero or an integer of 1 to 3.

Preferred recurring units ($R_{PSU\_Cl}$) are selected from the group consisting of those of formula (A'-1) to (A'-3) herein below:

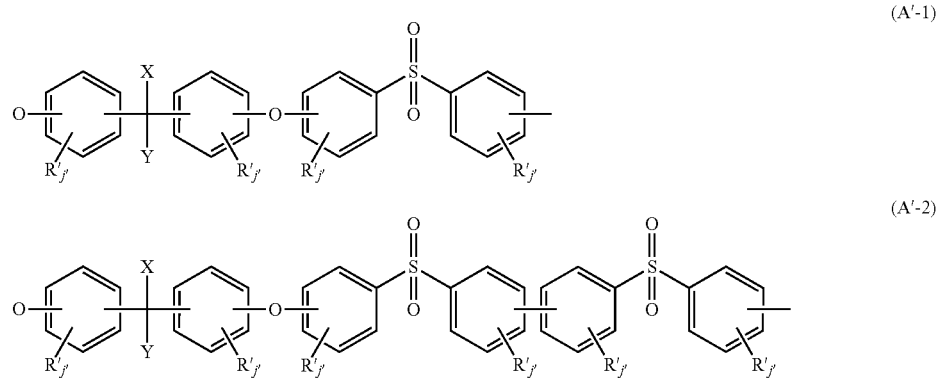

-continued

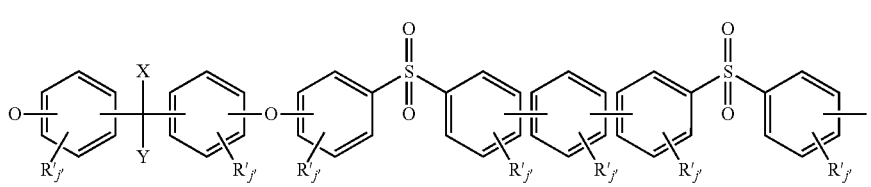

(A'-3)

wherein:
- each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
- j' is zero or is an integer from 0 to 4;
- X and Y, equal to or different from each other, are independently selected from the group consisting of an alkyl, preferably $CH_3$ and an halogenated alkyl, preferably $CF_3$, preferably X and Y are $CH_3$.

Most preferred recurring units ($R_{PSU\_Cl}$) is of formula ($A_{PSU\_Cl}$), herein below:

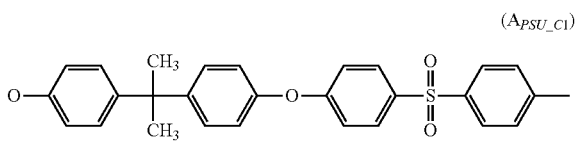

($A_{PSU\_Cl}$)

In the polymer ($PSU_{Cl}$), as detailed above, preferably more than 60% by moles, more preferably more than 80% by moles, still more preferably more than 90% by moles of the recurring units are recurring units ($R_{PSU\_Cl}$) of formula (A), as detailed above.

Still, it is generally preferred that substantially all recurring units of the polymer ($PSU_{Cl}$) are recurring units ($R_{PSU\_Cl}$) of formula (A), as detailed above; chain defects, or very minor amounts of other units might be present, being understood that these latter do not substantially modify the properties of the polymer ($PSU_{Cl}$). Most preferably, all the recurring units of the polymer ($PSU_{Cl}$) are recurring units ($R_{PSU\_Cl}$) of formula (A).

The polymer ($PSU_{Cl}$) may be notably a homopolymer, a random, alternate or block copolymer. When the polymer ($PSU_{Cl}$) is a copolymer, it may notably contain (i) recurring units ($R_{PSU\_Cl}$) of at least two different formulae chosen from formulae (A'-1) to (A'-3), or (ii) recurring units ($R_{PSU\_Cl}$) of one or more formulae (A'-1) to (A'-3) and recurring units ($R*_{PSU\_Cl}$) different from recurring units ($R_{PSU\_Cl}$).

According to a very preferred embodiment, the polymer ($PSU_{Cl}$) comprises more than 50% by moles of recurring units ($R_{PSU\_Cl}$) of formula ($A_{PSU\_Cl}$), as shown above.

Preferably more than 60% by moles, preferably more than 80% by moles, preferably more than 90% by moles, preferably more than 95% by moles of the recurring units of the polymer ($PSU_{Cl}$) are recurring units of formula ($A_{PSU\_Cl}$).

Still, it is generally preferred that substantially all recurring units of the polymer ($PSU_{Cl}$) are recurring units ($R_{PSU\_Cl}$) of formula ($A_{PSU\_Cl}$), as detailed above; chain defects, or very minor amounts of other units might be present, being understood that these latter do not substantially modify the properties of the polymer ($PSU_{Cl}$). Most preferably, all the recurring units of the polymer ($PSU_{Cl}$) are recurring units ($R_{PSU\_Cl}$) of formula ($A_{PSU\_Cl}$).

As said, the polymer ($PSU_{Cl}$) comprises at least two chain ends and wherein at least one chain end comprises a unit ($R_{end}$) of formula (B), as detailed above.

According to a preferred embodiment, the polymer ($PSU_{Cl}$) comprises two chain ends; more preferably, at least one chain end comprises an unit ($R_{end}$), as described above, in which $R_1$ is linear or branched alkyl having from 1 to 10 carbon atoms, optionally halogenated, cycloaliphatic, or an aryl having from 6 to 12 carbon atoms; preferably R1 is a linear or branched alkyl having from 1 to 10 carbon atoms, preferably $R_1$ is a primary alkyl group. Even more preferably, at least one chain end comprises an unit ($R_{end}$) of formula (B'-1), herein below:

Me—O—Ar-(CXY)-Ar'-            formula (B'-1)

wherein Ar, Ar', X and Y are as defined above.

According to a most preferred embodiment, the polymer ($PSU_{Cl}$) comprises more than 50% by moles of recurring units ($R_{PSU\_Cl}$) of formula ($A_{PSU\_Cl}$), as shown above and at least one chain end in said polymer ($PSU_{Cl}$) comprises a unit ($R_{end}$) of formula ($B_{OMe}$),

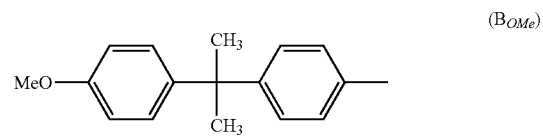

($B_{OMe}$)

As explained in more detail below, the unit ($R_{end}$) can be obtained by end-capping the polymer ($PSU_{Cl}$) of the invention by an organic halogen compound of formula (C): $R_1$—X' wherein X' is an halogen, preferably chlorine and $R_1$ is a hydrocarbon, optionally halogenated, having 1-30 carbon atoms selected from the group consisting of saturated or unsaturated, branched or unbranched, aliphatic, aromatic, cyclic, or polycyclic hydrocarbons; a linear or branched alkoxy group having 1-30 carbon atoms, an aryloxy group or an arylalkoxy group, preferably R1 is selected from the group consisting of linear or branched alkyl having from 1 to 10 carbon atoms, optionally halogenated, cycloaliphatic, or aryl having from 6 to 12 carbon atoms, more preferably, $R_1$ is a linear or branched alkyl having from 1 to 10 carbon atoms, even more preferably $R_1$ is a primary alkyl group, most preferably $R_1$ is a methyl group.

According to the present invention, the polymer ($PSU_{Cl}$) has advantageously a number of a unit ($R_{end}$) being equal to or less than 120 µeq/g, preferably equal to or less than 100 µeq/g, more preferably equal to or less than 90 µeq/g, more preferably equal to or less than 85 µeq/g, even more preferably equal to or less than 80 µeq/g.

According to the present invention, the number of a unit ($R_{end}$) in the polymer ($PSU_{Cl}$) is equal to or more than 25

μeq/g, preferably in an amount of equal to or more than 35 μeq/g, more preferably in an amount of equal to or more than 40 μeq/g, even more preferably in an amount of equal to or more than 45 μeq/g.

According to the present invention, the polymer ($PSU_{Cl}$) has advantageously 25-120 μeq/g of a unit ($R_{end}$), preferably 35-90 μeq/g of a unit ($R_{end}$), more preferably 40-85 μeq/g of a unit ($R_{end}$), even more preferably 45-80 μeq/g of a unit ($R_{end}$).

The Applicant has surprisingly found that the presence of the unit ($R_{end}$), as described above, especially avoids discoloration or other degradation phenomena thereby offering to the polymer ($PSU_{Cl}$) of the invention superior properties such as outstanding thermal oxidative and chemical stability, which allows them to be very useful as being comprised in parts of mobile electronic devices.

It is essential that the ($PSU_{Cl}$) polymer comprises a residual chlorine content in an amount of less than 25 μeq/g polymer, preferably less than 20 μeq/g, preferably less than 10 μeq/g, preferably less than 3 μeq/g.

For the purpose of the present invention, the term "residual chlorine content" refers to the total amount of chlorine being present such as notably in the form of organically bonded chlorine polymer end groups and residual chlorinated solvents, in particular monochlorobenzene and/or ionically bound form such as notably residual chlorine salts, in particular sodium chloride.

Analytical methods can be used for the determination of the total number of unit ($R_{end}$) and the residual chlorine content in the ($PSU_{Cl}$) polymer of the present invention, including notably coulometric methods, titration methods, ion chromatography, spectroscopic measurements such as IR and NMR or radioactive measurements such as for polymers with labeled end-groups.

Preferably, the residual chlorine content in the ($PSU_{Cl}$) polymer of the present invention are suitably determined by a coulometric method, known in the art. In said method, a Total Organic Halogen Analyzer, such as notably Thermo Scientific ESC 3000 Analyzer can be used. During analysis, a sample is in general weighed into a quartz boat and inserted into a heated combustion tube where the sample is typically burned in an oxygen rich stream. Combustion products are passed into a titration cell whereby hydrogen chloride from the combustion process is in general absorbed in an acetic acid solution. Chloride entering this cell is then in general titrated with a Silver electrode. The percent chlorine in the sample is typically calculated from the integrated current and the sample weight. Said resulting percent chlorine value in percent is then converted to an amount expressed in chlorine end group concentration in microequivalents per gram polymer.

Preferably, the total number of unit ($R_{end}$) are determined by NMR methods.

In a preferred specific embodiment of the present invention, the total number of the unit ($R_{end}$) of formula ($B_{OMe}$), as detailed above, can be determined by a $^1$H NMR method. In said $^1$H NMR method, the polymer is dissolved in deuterated tetrachloroethane-d2 and tetramethylsilane (TMS) is used as internal standard. The total number of the unit ($R_{end}$) of formula ($B_{OMe}$) expressed in μeq/g is typically derived from appropriate $^1$H NMR integral values, whereby said integral values can be measured by known NMR techniques, and can for example be calculated according to following formula:

$$N_{end} = \frac{(I_{(OMe)}/3) * 1000000}{((I_{(arom)}/N_{(arom)}) * FW)}$$

wherein $N_{end}$ corresponds to the total number of the unit ($R_{end}$) of formula ($B_{OMe}$) expressed in μeq/g;

$I_{OMe}$ corresponds to the total integral value of all OMe protons contained in the unit ($R_{end}$) of formula ($B_{OMe}$), which are typically in the proton region at around 3.70 to 3.90 ppm;

$I_{arom}$ corresponds to the total integral value of all aromatic protons contained in the recurring unit ($R_{PSU\_Cl}$), which are typically in the proton region at around 6.35 to 8.50 ppm; in general this value is set to 100;

$N_{arom}$ corresponds to the total number of aromatic protons in the recurring unit ($R_{PSU\_Cl}$);

FW corresponds to the formula weight of the recurring unit ($R_{PSU\_Cl}$).

In a preferred embodiment, the weight average molecular weight (Mw) of the polymer ($PSU_{Cl}$) is in the range from 20,000 to 120,000 grams per mole (g/mol), more preferably in the range from 40 to 100,000 grams per mole (g/mol), even more preferably in the range from 50,000 to 90,000 grams per mole (g/mol).

The ($PSU_{Cl}$) polymer of the present invention can be obtained by the polycondensation in a solvent mixture comprising a polar aprotic solvent and optionally an additional solvent, of at least one dichloro compound [dichloro (CC), herein after] of formula (S):

$$Cl\text{-}Ar^1\text{-}SO_2\text{-}[Ar^2\text{-}(T\text{-}Ar^3)_n\text{-}SO_2]_m\text{-}Ar^4\text{-}Cl \quad \text{formula (S)}$$

wherein $Ar^1$, $Ar^2$, $Ar^3$, $Ar^4$, n, m and T are as defined above, with at least one aromatic dihydroxy compound [diol (DD), herein after] of formula (T):

$$HO\text{-}Ar\text{-}(CXY)\text{-}Ar'\text{-}O\text{-}H$$

wherein Ar, Ar', X and Y are as defined above, in the presence of a base and an end-capping agent wherein said end-capping agent is an organic halogen compound of formula (C): $R_1$—X' as defined above.

Preferred diol (DD) are those complying with formulae (T'-1), as shown below:

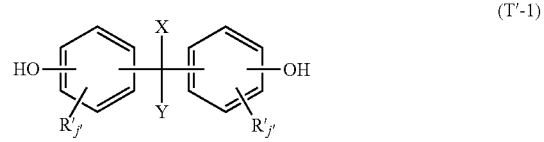

(T'-1)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

X and Y, equal to or different from each other, are independently selected from the group consisting of an alkyl, preferably $CH_3$ and an halogenated alkyl, preferably $CF_3$, preferably X and Y are $CH_3$.

Most preferred diol (DD) is 4,4'-dihydroxy-2,2-diphenyl-propane (i.e. known as Bisphenol A).

Preferred dichloro (CC) are those complying with formulae (S'-1) to (S'-3), as shown below:

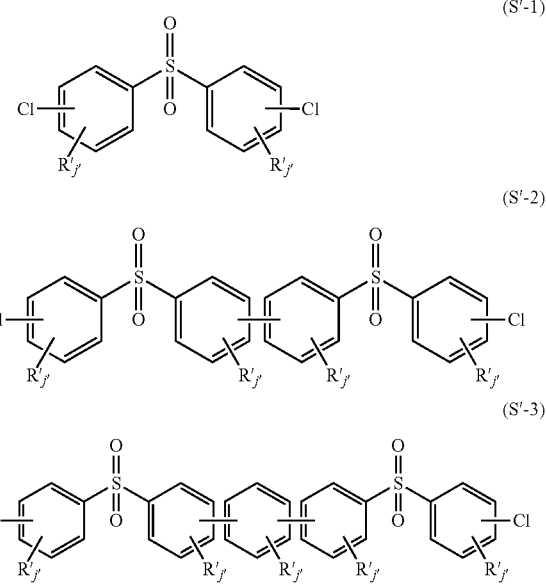

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 0 to 4;
Preferred dichloro (CC) is 4,4'-dichlorodiphenyl sulfone (DCDPS).

According to certain embodiments, the purity level of the dichloro (CC) is advantageously equal to or above 95%, more preferably equal to or above 98%, more preferably equal to or above 99% and most preferably at least 99.50%.

The purity levels of the dichloro (CC) can be measured by standard methods such as notably GC analyses.

When the polymer ($PSU_{Cl}$) is a copolymer comprising additionally recurring units ($R*_{PSU\_Cl}$) different from recurring units ($R_{PSU\_Cl}$) then the polycondensation reaction may comprise additionally reacting of at least one aromatic dihydroxyl compound [diol (D'D')] different from diol (DD), as above detailed; and at least one dichloroaryl compound [dihalo (C'C')] different from dihalo (CC), as above detailed.

Among dichloroaryl compound [dichloro (C'C')] different from dichloro (CC), mention can be notably made of 4,4'-dichlorobenzophenone.

Among aromatic dihydroxyl compound [diol (D'D')] different from diol (DD), mention can be made of bisphenol S, biphenol, hydroquinone, alkylated bisphenols such as notably dimethyl or tetramethyl Bisphenol A.

As said, it is essential that the ($PSU_{Cl}$) polymer comprises a residual chlorine content in an amount of less than 25 µeq/g polymer. To this aim, it is necessary that the dichloro (CC), as detailed above, is used in a controlled manner so that the molar ratio of the diol (DD), as detailed above, and optionally of the diol (D'D') to the dichloro (CC), as detailed above, and optionally the dichloro (C'C'), is advantageously from 1.005 to 1.030, preferably from 1.005 to 1.025, more preferably from 1.005 to 1.020, even more preferably from 1.005 to 1.015, most preferably from 1.008 to 1.012.

Preferred end-capping agents are linear or branched alkyl halides having from 1 to 10 carbon atoms, more preferably primary alkyl halides, in particular primary alkyl chlorides, most preferably methyl halides, in particular methyl chloride.

The end-capping agent is advantageously used in a molar amount ranging from about 0.1 to 50% mol with respect to the total amount of moles of the diol (DD), as detailed above, and optionally of the diol (D'D'), preferably from 1 to 20% mol, more preferably from 4 to 15% mol.

If desired, an additional solvent can be used together with the polar aprotic solvent which forms an azeotrope with water, whereby water formed as a by-product during the polymerization may be removed by continuous azeotropic distillation throughout the polymerization.

The by-product water and carbon dioxide possibly formed during the polymerization can alternatively be removed using a controlled stream of an inert gas such as nitrogen or argon over and/or in to the reaction mixture in addition to or advantageously in the absence of an azeotrope-forming solvent as described above.

For the purpose of the present invention, the term "additional solvent" is understood to denote a solvent different from the polar aprotic solvent and the reactants and the products of said reaction.

As polar aprotic solvents, sulphur containing solvents known and generically described in the art as dialkyl sulfoxides and dialkylsulfones wherein the alkyl groups may contain from 1 to 8 carbon atoms, including cyclic alkyliden analogs thereof, can be mentioned. Specifically, among the sulphur-containing solvents that may be suitable for the purposes of this invention are dimethylsulfoxide, dimethylsulfone, diphenylsulfone, diethylsulfoxide, diethylsulfone, diisopropylsulfone, tetrahydrothiophene-1, 1-dioxide (commonly called tetramethylene sulfone or sulfolane) and tetrahydrothiophene-1-monoxide and mixtures thereof.

Very good results have been obtained with dimethylsulfoxide.

Nitrogen-containing polar aprotic solvents, including dimethylacetamide, dimethylformamide and N-methyl pyrrolidone (i.e., NMP) and the like have been disclosed in the art for use in these processes, and may also be found useful in the practice of this invention.

The additional solvent that forms an azeotrope with water will generally be selected to be inert with respect to the monomer components and polar aprotic solvent. Suitable azeotrope-forming solvents for use in such polymerization processes include aromatic hydrocarbons such as benzene, toluene, xylene, ethylbenzene, chlorobenzene and the like.

Very good results have been obtained with chlorobenzene.

The azeotrope-forming solvent and polar aprotic solvent are typically employed in a weight ratio of from about 1:10 to about 1:1, preferably from about 1:5 to about 1:3.

The polycondensation reaction takes places in the presence of a base. Suitable bases are alkali metal carbonates such as notably chosen from the group consisting of sodium carbonate, potassium carbonate, rubidium carbonate and cesium carbonate; and alkali metal hydroxides, such as notably sodium hydroxide and potassium hydroxide. Preferred bases are alkali metal hydroxides, in particular sodium hydroxide is most preferred.

In a preferred embodiment, the base, in particular sodium hydroxide is first added to the diol (DD), as described above, in the solvent mixture, as described above, thereby providing a corresponding alkali metal salt of general formula (M), herein below:

MO-Ar-(CXY)-Ar'-OM formula (M)

wherein Ar, Ar', X and Y are as defined above, and M is an alkali metal, preferably sodium.

The amount of said alkali metal hydroxide used, when expressed by the ratio of the equivalents of alkali metal (M) per equivalent of hydroxyl group (OH) [eq. (M)/eq. (OH)] ranges from 1.3 to 4.0, preferably from 1.4 to 3, and more preferably from about 1.5 to 2.5, being understood that above mentioned hydroxyl group equivalents are comprehensive of those of the diol (DD) and, if present, of diol (D'D'). Very good results have been obtained with a ratio of eq. (M)/eq. (OH) of 2.0.

The condensation reaction to produce the alkali metal salt of general formula (M), as described above, is generally carried out at a temperature from 50-325° C., preferably from 120 to 230° C., more preferably from 140 to 170° C.

Preferably, the dichloro (CC) is then added to the alkali metal salt of general formula (M), as described above, after removal of the water by continuous azeotropic distillation, as described above. The reaction of the alkali metal salt of general formula (M) is generally carried out at an elevated temperature from 140-250° C., preferably from 150 to 190° C., more preferably from 155 to 180° C.

In general, the end-capping agent, as described above, is added to the reaction mixture after the reaction of the dichloro (CC), as described above, with the alkali metal salt of general formula (M), as described above, and is usually carried out at a temperature from 80-180° C., preferably from 110 to 140° C., more preferably from 115 to 135° C.

Composition (C)

The composition (C) comprises the polymer ($PSU_{Cl}$) of the present invention preferably in an amount of more than 85% wt., preferably in an amount of more than 90% wt., preferably more than 95% wt. and more preferably more than 99% wt., relative to the total weight of the composition (C).

If desired, the composition (C) consists of the polymer ($PSU_{Cl}$).

The composition (C) of the present invention may further comprise at least one other thermoplastic polymer (polymer T).

Non limitative examples of polymers (T) suitable for use in composition (C) of the present invention, include for example polyetherimide, polyphenylsulfide, polycarbonate, polyethersulfone, polyphenylsulfone, polyarylene in particular polyphenylene, poly(arylether ketone), polyesters, polyamideimides, polyamides, poly(benzimidazole), poly(benzobisoxazoles), polyphosphonates, polynitriles and/or polyphosphates.

The weight of said other polymers is advantageously below 20% wt., preferably below 15% wt., more preferably below 10% wt. and even more preferably below 10% wt., based on the total weight of the composition (C).

The composition (C) can further comprise one or more ingredients other than the polymer ($PSU_{Cl}$) [ingredient (I), herein after].

Non limitative examples of ingredient (I) suitable for use in composition (C) of the present invention, are polymeric compositions, additives such as UV absorbers; stabilizers such as light stabilizers and heat stabilizers; antioxidants; lubricants; processing aids; plasticizers; flame retardants, pigments such as notably titanium dioxide; dyes; colorants; anti-static agents; metal deactivators; conductivity additive such as carbon black and carbon nanofibrils and combinations comprising one or more of the foregoing additives.

The weight of said ingredient (I) is advantageously below 20% wt. and preferably below 18% wt., based on the total weight of the composition (C). If desired, the composition (C) comprises more than 80 wt. % of the polymer ($PSU_{Cl}$) with the proviso that the polymer ($PSU_{Cl}$) is the only polymeric components in the composition (C) and one or more optional ingredient such as notably UV absorbers; stabilizers such as light stabilizers and heat stabilizers; antioxidants; lubricants; processing aids; plasticizers; flame retardants, pigments; dyes; colorants; anti-static agents; metal deactivators; conductivity additive such as carbon black and carbon nanofibrils might be present therein, without these components dramatically affecting relevant mechanical and toughness properties of the composition (C).

The expression 'polymeric components' is to be understood according to its usual meaning, i.e. encompassing compounds characterized by repeated linked units, having typically a molecular weight of 2 000 or more.

The polymer composition (C) may further comprise at least one reinforcing filler. Reinforcing fillers are well known by the skilled in the art. They are preferably selected from fibrous and particulate fillers different from the pigment as defined above. More preferably, the reinforcing filler is selected from mineral fillers (such as talc, mica, kaolin, calcium carbonate, calcium silicate, magnesium carbonate), glass fiber, carbon fibers, synthetic polymeric fiber, aramid fiber, aluminum fiber, titanium fiber, magnesium fiber, boron carbide fibers, rock wool fiber, steel fiber, wollastonite etc. Still more preferably, it is selected from mica, kaolin, calcium silicate, magnesium carbonate, glass fiber and wollastonite etc.

Preferably, the filler is chosen from fibrous fillers. A particular class of fibrous fillers consists of whiskers, i.e. single crystal fibers made from various raw materials, such as $Al_2O_3$, SiC, BC, Fe and Ni.

In a preferred embodiment of the present invention the reinforcing filler is chosen from wollastonite and glass fiber. Among fibrous fillers, glass fibers are preferred; they include chopped strand A-, E-, C-, D-, S-, T- and R-glass fibers, as described in chapter 5.2.3, p. 43-48 of Additives for Plastics Handbook, $2^{nd}$ edition, John Murphy.

Glass fibers optionally comprised in polymer composition (C) may have a circular cross-section or a non-circular cross-section (such as an oval or rectangular cross-section).

When the glass fibers used have a circular cross-section, they preferably have a diameter of 3 to 30 μm and particularly preferred of 5 to 10 μm. Different sorts of glass fibers with a circular cross-section are available on the market depending on the type of the glass they are made of. One may notably cite glass fibers made from E- or S-glass.

Good results were obtained with standard E-glass material with a non-circular cross section. Excellent results were obtained when the polymer composition with S-glass fibers with a round cross-section and, in particular, when using round cross-section with a 6 μm diameter (E-Glass or S-glass).

The weight of said reinforcing filler is advantageously preferably below 20% wt., more preferably below 18% wt. and even more preferably below 15% wt., based on the total weight of the composition (C).

Preferably, the reinforcing filler is present in an amount ranging from 0.05 to 19 wt. %, preferably from 2 to 15 wt. %, preferably from 5 to 10 wt. %, based on the total weight of the polymer composition (C).

The composition (C) can be prepared by a variety of methods involving intimate admixing of the polymer materials with any optional ingredient, as detailed above, desired in the formulation, for example by melt mixing or a combination of dry blending and melt mixing. Typically, the dry blending of the polymer ($PSU_{Cl}$), optionally the polymers (T), optionally the reinforcing filler and optionally ingredient (I), as above details, is carried out by using high intensity mixers, such as notably Henschel-type mixers and ribbon mixers.

So obtained powder mixture can comprise the polymer ($PSU_{Cl}$), optionally the polymers (T), optionally the reinforcing filler and optionally ingredient (I) in the weight ratios as above detailed, suitable for obtaining effective formation of the above described parts of a mobile electronic device, or can be a concentrated mixture to be used as masterbatch and diluted in further amounts of the polymer ($PSU_{Cl}$), optionally the polymers (T), optionally the reinforcing filler and optionally ingredient (I) in subsequent processing steps.

It is also possible to manufacture the composition of the invention by further melt compounding the powder mixture as above described. As said, melt compounding can be effected on the powder mixture as above detailed, or preferably directly on the polymer ($PSU_{Cl}$), optionally the polymers (T), optionally the reinforcing filler and optionally ingredient (I). Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

If desired, the design of the compounding screw, e.g. flight pitch and width, clearance, length as well as operating conditions will be advantageously chosen so that sufficient heat and mechanical energy is provided to advantageously fully melt the powder mixture or the ingredients as above detailed and advantageously obtain a homogeneous distribution of the different ingredients. Provided that optimum mixing is achieved between the bulk polymer and filler contents. It is advantageously possible to obtain strand extrudates which are not ductile of the composition (C) of the invention. Such strand extrudates can be chopped by means e.g. of a rotating cutting knife after some cooling time on a conveyer with water spray. Thus, for example composition (C) which may be present in the form of pellets or beads can then be further used for the manufacture of the above described part of a mobile electronic device.

Another objective of the present invention is to provide a method for the manufacture of the above described part of a mobile electronic device. Such method is not specifically limited. The polymer composition (C) may be generally processed by injection molding, extrusion or other shaping technologies. It preferably comprises the injection molding of the polymer composition (C). Thus, the method for the manufacture of the above described part of a mobile electronic device includes preferably the step of injection molding and solidification of the polymer composition (C).

The parts of the mobile electronic devices according to the present invention may be coated with metal by any known methods for accomplishing that, such as vacuum deposition (including various methods of heating the metal to be deposited), electroless plating, electroplating, chemical vapor deposition, metal sputtering, and electron beam deposition. Although the metal may adhere well to the parts without any special treatment, usually some well known in the art method for improving adhesion will be used. This may range from simple abrasion of the synthetic resin surface to roughen it, addition of adhesion promotion agents, chemical etching, functionalization of the surface by exposure to plasma and/or radiation (for instance laser or UV radiation) or any combination of these. Also, some of the metal coating methods comprise at least one step where the part is immersed in an acid bath. More than one metal or metal alloy may be plated onto the parts made of the polymer composition (C), for example one metal or alloy may be plated directly onto the synthetic resin surface because of its good adhesion, and another metal or alloy may be plated on top of that because it has a higher strength and/or stiffness. Useful metals and alloys to form the metal coating include copper, nickel, iron-nickel, cobalt, cobalt-nickel, and chromium, and combinations of these in different layers. Preferred metals and alloys are copper, nickel, and iron-nickel, and nickel is more preferred. The surface of the part may be fully or partly coated with metal. Preferably more than 50 percent of the surface area will be coated, more preferably all of the surface will be coated. In different areas of the part the thickness and/or the number of metal layers, and/or the composition of the metal layers may vary. The metal may be coated in patterns to efficiently improve one or more properties in certain sections of the part.

Another objective of the present invention is to provide a method for the manufacture of the above described mobile electronic device comprising at least one part comprising the polymer composition (C), said method including the steps of:

providing as components at least a circuit board, a screen and a battery;

providing at least one part comprising the polymer composition (C);

assembling at least one of said components with said part or mounting at least one of said components on said part.

Mobile electronic devices are very often commercialized in a black color. However, there is a growing market interest in colored mobile electronic devices. The present invention allows the manufacture of colored mobile electronic device, and in particular colored mobile electronic device housings.

The above described method for the manufacture of the mobile electronic device may thus further include an additional step of painting or coating said part comprising the polymer composition (C).

Excellent results were obtained when the mobile electronic device was first painted with a primer coating paint and then with a top coating paint. These coatings gave surprisingly excellent results in adhesion tests. In addition, the present invention provides the great benefit that the polymer composition (C) has an excellent colorability using the above described pigments and also an excellent paintability using the above mentioned paints.

Should the disclosure of any patents, patent applications, and publications which are incorporated herein by reference conflict with the description of the present application to the extent that it may render a term unclear, the present description shall take precedence.

The present invention is intended to be explained in more detail with reference to the subsequent examples without wishing to restrict the latter by the special embodiments shown here.

Generic Procedure to Make Low Cl Polysulfone Using 1 Mole % Excess Bis-A

To a 2-gallon stainless steel reactor, equipped with mechanical stirrer, thermocouple, nitrogen inlet, a distillation column with condenser and decanter were charged chlorobenzene (2002 g), DMSO (1118.5 g), bisphenol-A (547.91 g, 2.400 moles). The mixture was mixed and purged with dry nitrogen for 30 min at room temperature and then heated to 40° C. A continuous nitrogen purge was maintained. Caustic (191.5 g) was added to the reactor.

The reaction mixture was heated and dehydrated using chlorobenzene as the azeotropic solvent. The temperature was slowly raised to 150-155° C., while removing water and chlorobenzene thorough the decanter. A chlorobenzene solution of 4,4'-dichlorodiphenyl sulfone (DCDPS) (682.33 g, 2.376 moles in 510 g chlorobenzene) maintained at 120-130° C. was added to the reactor over 10 minutes. After the addition was completed, the reactor temperature was raised to 165-170° C. and the polymerization was allowed to proceed until desired molecular weight was achieved. The reaction mixture was quenched with chlorobenzene (710 g) to ~120-130° C. and maintained. Methyl chloride was added to the reaction mixture. After methyl chloride addition was completed, additional chlorobenzene (3733 g) was added to the reactor. The reaction mixture was cooled to ~90° C.

The reaction mixture was filtered using a 2.7 μm glass-fiber filter pad to remove reaction salts. The filtrate was coagulated using methanol as the non-solvent in a Waring blender. The coagulum was reslurried two times with methanol in the blender, filtered, and dried in a vacuum oven (30 mmHg) at 120° C.

The residual chlorine was found to be 23 μeq/g.

Generic Procedure 2 to Make Low Cl Polysulfone Using Different Excesses of Bis-A and Different Purity Levels of DCDPS To a 1-liter glass polymerization kettle, equipped with an anchor paddle with overhead agitator, nitrogen inlet, vigreux column, a modified barrette trap with water-cooled condenser were charged Bis A in different excesses (1.25 to 2.00 mole % excess relative to DCDPS, chlorobenzene (319.59 g), DMSO (134.27 g). The reaction mixture was stirred to dissolve Bis A under a nitrogen purge for ~30 minutes. The mixture was heated to about 40° C. and a 50% aqueous caustic in the appropriate amount (i.e. NaOH; amounts expressed by the ratio of the equivalents of alkali metal (Na) per equivalent of hydroxyl group (OH) [eq. (Na)/eq. (OH)] was added slowly.

The reaction mixture was heated and dehydrated using chlorobenzene as the azeotropic solvent. The temperature was slowly raised to 155° C. A solution of DCDPS having the appropriate purity level (141.47 g) in 142 g chlorobenzene maintained at 120-130° C. was slowly added to the kettle through an addition funnel. The reaction temperature was raised to 165-170° C. and maintained until high molecular weight polymer was obtained. The reaction mixture was quenched with chlorobenzene (400 g) and cooled to 120° C. Methyl chloride gas was bubbled slowly for 20 minutes (~20-22 g). After methyl chloride addition was completed, 1.16 g of aqueous caustic (25 wt %) was added and the mixture was stirred for 15 minutes followed by addition of methyl chloride (15-20 g). The reaction mixture was cooled to 90° C. by adding 200 g chlorobenzene. A dilute oxalic acid solution in DMSO was added to the reaction mixture until a pH of 4 (as measured by a pH paper) was achieved.

The reaction mixture was filtered through a 2.7 μm glass-fiber filter pad to remove the salts. The polymer solution was coagulated using methanol as the non-solvent in a Waring blender. The coagulum was reslurried two times with methanol in the blender, filtered, and dried in a vacuum oven (~30 mmHg) at 120° C. for 12-20 hours.

Example 2

Example 2 has been prepared according to general procedure 2, using DCDPS having a purity of 99.15%, using 1.50% mole % excess Bis-A relative to DCDPS and using NaOH in a ratio of eq. (Na)/eq. (OH) of 1.998. The residual chlorine was found to be 12 μeq/g.

Example 3

Example 3 has been prepared according to general procedure 2, using DCDPS having a purity of 99.91%, using 1.50% mole % excess Bis-A relative to DCDPS and using NaOH in a ratio of eq. (Na)/eq. (OH) of 1.998. The residual chlorine was found to be 3 μeq/g.

Example 4

Example 4 has been prepared according to general procedure 2, using DCDPS having a purity of 99.91%, using 1.50% mole % excess Bis-A relative to DCDPS and using NaOH in a ratio of eq. (Na)/eq. (OH) of 1.992. The residual chlorine was found to be 5 μeq/g.

Example 5

Example 5 has been prepared according to general procedure 2, using DCDPS having a purity of 99.91%, using 2.00% mole % excess Bis-A relative to DCDPS and using NaOH in a ratio of eq. (Na)/eq. (OH) of 1.992. The residual chlorine was found to be 2 μeq/g.

Example 6

Example 6 has been prepared according to general procedure 2, using DCDPS having a purity of 99.70%, using 1.50% mole % excess Bis-A relative to DCDPS and using NaOH in a ratio of eq. (Na)/eq. (OH) of 1.992. The residual chlorine was found to be 10 μeq/g.

Example 7

Example 7 has been prepared according to general procedure 2, using DCDPS having a purity of 99.40%, using 1.50% mole % excess Bis-A relative to DCDPS and using NaOH in a ratio of eq. (Na)/eq. (OH) of 1.992. The residual chlorine was found to be 13 μeq/g.

Example 8

Example 8 has been prepared according to general procedure 2, using DCDPS having a purity of 99.07%, using 1.25% mole % excess Bis-A relative to DCDPS and using NaOH in a ratio of eq. (Na)/eq. (OH) of 1.998. The residual chlorine was found to be 16 μeq/g.

The invention claimed is:

1. A mobile electronic device comprising at least one part made of a polymer composition (C), comprising more than 80% by weight (% wt.) relative to a total weight of the composition (C) of an aromatic polysulfone polymer comprising a residual chlorine content in an amount of less than 25 μeq/g, polymer ($PSU_{Cl}$), wherein more than 50% by moles of the recurring units of said polymer ($PSU_{Cl}$) are recurring units ($R_{PSU\_Cl}$) of formula (A):

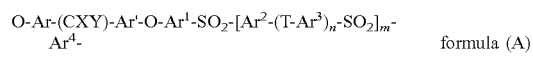

formula (A)

wherein n and m, equal to or different from each other, are independently zero or an integer of 1 to 5;

each of Ar, Ar', Ar$^1$, Ar$^2$, Ar$^3$ and Ar$^4$ equal to or different from each other and at each occurrence, is an aromatic moiety, X and Y, equal to or different from each other and at each occurrence, are independently selected from the group consisting of hydrogen, halogen, alkyl, arylalkyl, hydroxyalkyl, hydroxyarylalkyl, halogenated alkyl, halogenated arylalkyl, alkenyl, alkynyl, alkyloxy, arylalkyloxy, aminoalkyl, aminoarylalkyl, alkyl and arylalkyl substituted by carboxylic acid, ester, amide, aldehyde, and ketone function; and T is a bond or a divalent group optionally comprising one or more than one heteroatom;

wherein said polymer (PSU$_{Cl}$) comprises at least two chain ends and wherein at least one chain end comprises a unit (R$_{end}$) of formula (B):

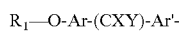  formula (B)

wherein:

Ar, Ar', X and Y are as defined above; and

R$_1$ is a hydrocarbon, optionally halogenated, having 1-30 carbon atoms selected from the group consisting of saturated or unsaturated, branched or unbranched, aliphatic, aromatic, cyclic, or polycyclic hydrocarbons, a linear or branched alkoxy group having 1-30 carbon atoms, an aryloxy group, or an arylalkoxy group, wherein the polymer (PSU$_{Cl}$) is obtained by polycondensation in a solvent mixture comprising a polar aprotic solvent and optionally an additional solvent:

wherein each of Ar, Ar', equal to or different from each other and at each occurrence, is an aromatic moiety; and X and Y, equal to or different from each other and at each occurrence, are independently selected from the group consisting of hydrogen, halogen, alkyl, arylalkyl, hydroxyalkyl, hydroxyarylalkyl, halogenated alkyl, halogenated arylalkyl, alkenyl, alkynyl, alkyloxy, arylalkyloxy, aminoalkyl, am inoarylalkyl, alkyl and arylalkyl substituted by carboxylic acid, ester, amide, aldehyde, and ketone function;

in the presence of a base and an end-capping agent wherein said end-capping agent is an organic halogen compound of formula (C): R$_1$—X' wherein

X' is an halogen; and

R$_1$ is a hydrocarbon, optionally halogenated, having 1-30 carbon atoms selected from the group consisting of saturated or unsaturated, branched or unbranched, aliphatic, aromatic, cyclic, or polycyclic hydrocarbons; a linear or branched alkoxy group having 1-30 carbon atoms, an aryloxy group, or an arylalkoxy group.

2. The mobile electronic device according to claim 1, wherein the recurring units (R$_{PSU\_Cl}$) are selected from the group consisting of those of formula (A'-1) to (A'-3):

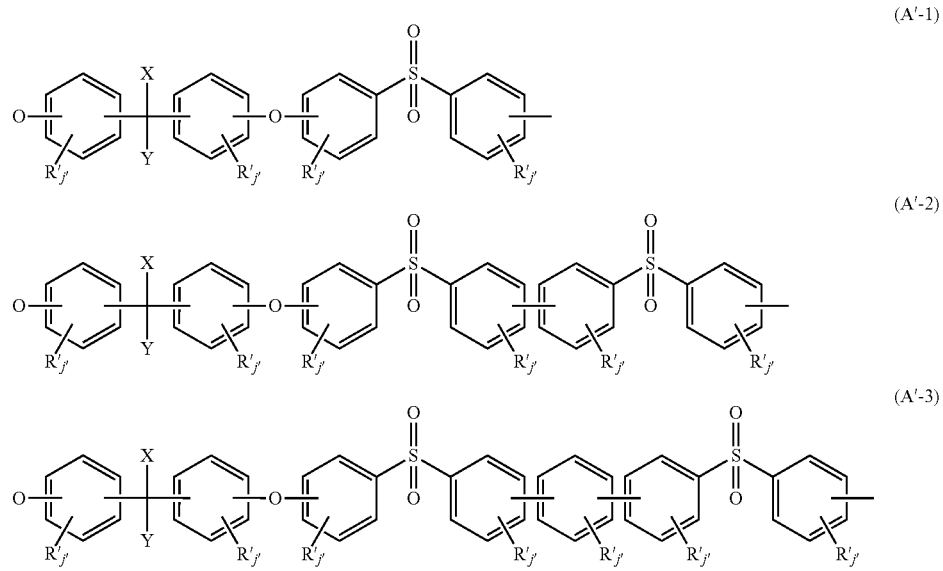

of at least one dichloro compound (CC) of formula (S):

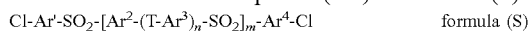  formula (S)

wherein n and m, equal to or different from each other, are independently zero or an integer of 1 to 5;

each of Ar', Ar$^2$, Ar$^3$ and Ar$^4$ equal to or different from each other and at each occurrence, is an aromatic moiety; and T is a bond or a divalent group optionally comprising one or more than one heteroatom;

with at least one aromatic dihydroxy compound, diol (DD), of formula (T):

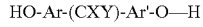  formula (T)

wherein:

each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium;

j' is zero or is an integer from 0 to 4; and

X and Y, equal to or different from each other, are independently selected from the group consisting of an alkyl, and an halogenated alkyl.

3. The mobile electronic device according to claim 2, wherein X and Y, equal to or different from each other, are independently selected from CH$_3$ and CF$_3$.

4. The mobile electronic device according to claim 1, wherein the recurring units (R$_{PSU\_Cl}$) are of formula (A$_{PSU\_Cl}$):

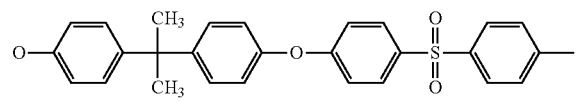

5. The mobile electronic device according to claim 1, wherein the unit (R$_{end}$) is of formula (B'-1):

Me—O-Ar-(CXY)-Ar'-    formula (B'-1)

wherein:
each of Ar, Ar', equal to or different from each other and at each occurrence, is an aromatic moiety; and
X and Y, equal to or different from each other and at each occurrence, are independently selected from the group consisting of hydrogen, halogen, alkyl, arylalkyl, hydroxyalkyl, hydroxyarylalkyl, halogenated alkyl, halogenated arylalkyl, alkenyl, alkynyl, alkyloxy, arylalkyloxy, aminoalkyl, aminoarylalkyl, alkyl and arylalkyl substituted by carboxylic acid, ester, amide, aldehyde, and ketone function.

6. The mobile electronic device according to claim 1, wherein the polymer (PSU$_{Cl}$) has a number of the unit (R$_{end}$) being equal to or less than 120 µeq/g.

7. The mobile electronic device according to claim 1, wherein the polycondensation reaction comprises additionally reacting at least one aromatic dihydroxyl compound, diol (D'D'), which is different from diol (DD), and at least one dichloroaryl compound, dihalo (C'C'), which is different from dihalo (CC), wherein the diol (D'D') different from diol (DD) is selected from the group consisting of bisphenol S, biphenol, hydroquinone, and alkylated bisphenols.

8. The mobile electronic device according to claim 1, wherein the end-capping agent R$_1$—X' is used in a molar amount ranging from about 0.1 to 50% mol with respect to the total amount of moles of the diol (DD).

9. The mobile electronic device according to claim 1, wherein the polymer composition (C) further comprises at least one other thermoplastic polymer, (polymer T), that is different from the polymer (PSU$_{Cl}$).

10. The mobile electronic device according to claim 1, wherein the polymer composition (C) further comprises one or more ingredients other than the polymer (PSU$_{Cl}$), as ingredient (I).

11. The mobile electronic device according to claim 1, wherein the polymer composition (C) further comprises at least one reinforcing filler.

12. The mobile electronic device according to claim 11, wherein the reinforcing filler is selected from wollastonite and glass fiber.

13. The mobile electronic device according to claim 1, wherein said part is a mobile electronic device housing.

14. The mobile electronic device according to claim 13, wherein said mobile electronic device housing is a mobile phone housing.

15. A method for manufacturing the mobile electronic device according to claim 1, said method including the steps of:
a) providing as components at least a circuit board, a screen, and a battery;
b) providing at least one part comprising the polymer composition (C);
c) assembling at least one of said components with said part or mounting at least one of said components on said part.

16. The method for manufacturing the mobile electronic device according to claim 15, comprising a step of injection molding and solidification of the polymer composition (C) to manufacture the part.

17. The mobile electronic device according to claim 1, wherein T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

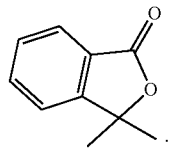

* * * * *